United States Patent
Kang

(10) Patent No.: US 11,544,083 B2
(45) Date of Patent: Jan. 3, 2023

(54) DISPLAY APPARATUS AND CONTROL METHOD THEREOF

(71) Applicant: SAMSUNG ELECTRONICS CO., LTD., Suwon-si (KR)

(72) Inventor: Kunsok Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 235 days.

(21) Appl. No.: 16/913,050

(22) Filed: Jun. 26, 2020

(65) Prior Publication Data

US 2020/0409726 A1 Dec. 31, 2020

Related U.S. Application Data

(60) Provisional application No. 62/866,701, filed on Jun. 26, 2019.

(30) Foreign Application Priority Data

Jan. 2, 2020 (KR) .................. 10-2020-0000328

(51) Int. Cl.
*G06F 9/451* (2018.01)
*G09G 5/00* (2006.01)
(Continued)

(52) U.S. Cl.
CPC .......... *G06F 9/451* (2018.02); *G06F 3/0482* (2013.01); *G09G 5/006* (2013.01); *H04N 21/43635* (2013.01); *G09G 2370/12* (2013.01)

(58) Field of Classification Search
CPC ..... G06T 7/292; G06V 20/42; G06F 11/0793; G06F 11/0706; G06F 8/443;
(Continued)

(56) References Cited

U.S. PATENT DOCUMENTS 8,438,319 B1 * 5/2013 Edney ................ G06F 13/4221
710/17
10,275,370 B2 4/2019 Perez et al.
(Continued)

FOREIGN PATENT DOCUMENTS

AU 2013239344 A1 * 10/2014 ........... H04B 5/0012
CA 2865306 A1 * 8/2013 ....... G06F 17/30126
(Continued)

OTHER PUBLICATIONS

Communication dated Feb. 24, 2022 issued by the European Patent Office in counterpart European Application No. 20831997.0.
(Continued)

*Primary Examiner* — Steven P Sax
(74) *Attorney, Agent, or Firm* — Sughrue Mion, PLLC

(57) ABSTRACT

A display apparatus includes a display, an interface, and a processor configured to, based on a dongle in which an application is stored being connected to the interface, display the application stored in the dongle on the display based on information on the application received from the dongle, and based on receiving a user command for selecting the application displayed on the display, transmit a command for executing the selected application to the dongle through the interface, and based on receiving an execution screen of the application executed in the dongle through the interface according to the command, display the received execution screen on the display The processor is further configured to, based on receiving the user command, transmit, through the interface, a command for communicating with an electronic apparatus, so that the dongle is connected to the electronic apparatus.

8 Claims, 15 Drawing Sheets

(51) Int. Cl.
*H04N 21/4363* (2011.01)
*G06F 3/0482* (2013.01)

(58) Field of Classification Search
CPC .... G06F 9/45504; G06F 13/387; G06F 9/451; G06F 3/0482; G06F 3/0484; G06F 3/0488; H04W 12/03; H04L 12/12; G09G 5/00; G09G 5/006; G09G 2370/12; H04N 21/4122; H04N 21/43635
See application file for complete search history.

(56) References Cited

U.S. PATENT DOCUMENTS

| | | | |
|---|---|---|---|
| 10,356,142 B1 | 7/2019 | Rajagopalan et al. | |
| 11,210,147 B2 | 12/2021 | Ahn et al. | |
| 2007/0287493 A1* | 12/2007 | Stephens | H01Q 1/2266 455/550.1 |
| 2012/0047277 A1* | 2/2012 | Keidar | H04L 65/65 348/731 |
| 2013/0162519 A1* | 6/2013 | Ameling | G06F 9/451 345/156 |
| 2014/0195584 A1* | 7/2014 | Harrison | H04L 67/02 709/201 |
| 2014/0215457 A1 | 7/2014 | Gava et al. | |
| 2014/0359685 A1* | 12/2014 | Liu | H04N 21/6125 725/110 |
| 2016/0050485 A1* | 2/2016 | Anderson | H04R 1/1091 381/74 |
| 2016/0072797 A1 | 3/2016 | Wilson et al. | |
| 2016/0094873 A1* | 3/2016 | Zou | H04N 21/43637 725/38 |
| 2016/0196220 A1* | 7/2016 | Perez | G06F 13/102 710/73 |
| 2016/0253142 A1* | 9/2016 | Choi | G06F 3/1454 345/1.3 |
| 2016/0275036 A1* | 9/2016 | Chew | G06F 13/4282 |
| 2016/0350058 A1* | 12/2016 | Zhu | H04N 21/4126 |
| 2017/0026442 A1 | 1/2017 | Archibong et al. | |
| 2017/0200144 A1* | 7/2017 | Chatterton | G06Q 20/327 |
| 2017/0244779 A1* | 8/2017 | Reichling | H04N 21/482 |
| 2017/0354574 A1* | 12/2017 | Feng | A61J 7/0084 |
| 2018/0063575 A1* | 3/2018 | Lee | H04N 21/43637 |
| 2018/0070127 A1* | 3/2018 | Kumar | H04N 21/4344 |
| 2018/0075380 A1* | 3/2018 | Perl | G06Q 50/30 |
| 2018/0242034 A1 | 8/2018 | Ogle et al. | |
| 2019/0042338 A1 | 2/2019 | Ahn et al. | |
| 2019/0238899 A1* | 8/2019 | Jimenez | H04L 65/4076 |
| 2020/0007932 A1* | 1/2020 | Zavesky | H04N 21/44016 |
| 2020/0077144 A1* | 3/2020 | Zavesky | H04N 21/454 |
| 2020/0306625 A1* | 10/2020 | Palmer | G06F 3/0346 |
| 2021/0264141 A1* | 8/2021 | Chojnacki | G06T 7/292 |

FOREIGN PATENT DOCUMENTS

| | | | | |
|---|---|---|---|---|
| CA | 3085126 A1 * | 7/2019 | | G06F 13/122 |
| CN | 106485895 A | 3/2017 | | |
| JP | 6556849 B2 | 8/2019 | | |
| KR | 10-2009-0095002 A | 9/2009 | | |
| KR | 10-1112183 B1 | 6/2012 | | |
| KR | 10-1231104 B1 | 2/2013 | | |
| KR | 10-1283324 B1 | 7/2013 | | |
| KR | 10-2015-0074446 A | 7/2015 | | |
| KR | 10-1582795 B1 | 1/2016 | | |
| KR | 10-2016-0083764 A | 7/2016 | | |
| KR | 10-2017-0092470 A | 8/2017 | | |
| KR | 10-2018-0041961 A | 4/2018 | | |
| WO | WO-2017095879 A1 * | 6/2017 | | G06F 3/0482 |
| WO | WO-2017189929 A1 * | 11/2017 | | G09G 5/00 |

OTHER PUBLICATIONS

"High-Definition Multimedia Interface", Specification Version 1.2a, HDMI Licensing, LLC., Dec. 14, 2005, 193 pages total, XP030001518.
International Search Report dated Oct. 8, 2020 issued by the International Searching Authority in counterpart International Application No. PCT/KR2020/008294 (PCT/ISA/210).
International Written Opinion dated Oct. 8, 2020 issued by the International Searching Authority in counterpart International Application No. PCT/KR2020/008294 (PCT/ISA/237).

* cited by examiner

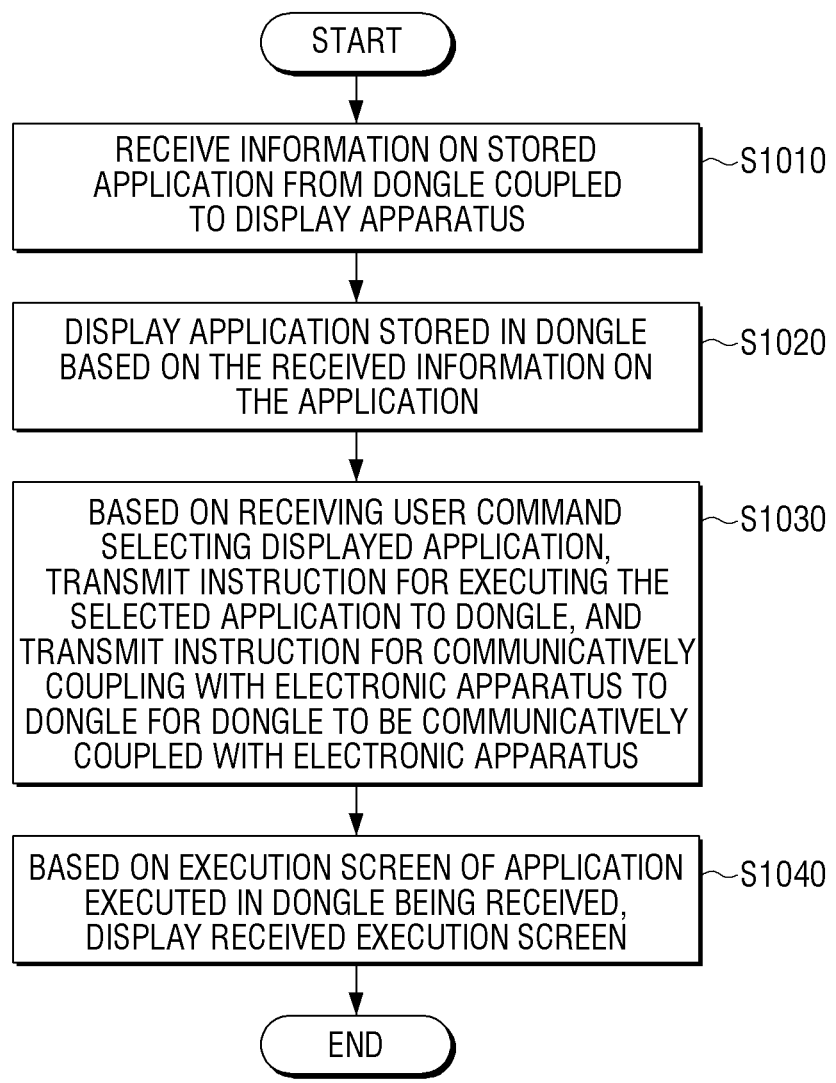

DISPLAY APPARATUS AND CONTROL METHOD THEREOF

CROSS-REFERENCE TO RELATED APPLICATIONS

This application is based on and claims priority under 35 U.S.C. § 119 to Korean Patent Application No. 10-2020-0000328, filed on Jan. 2, 2020, in the Korean Intellectual Property Office, which claims the benefit of U.S. Provisional Application No. 62/866,701, filed on Jun. 26, 2019. The disclosures of the above-named applications are incorporated by reference herein in their entireties.

BACKGROUND

1. Field

The disclosure relates to a display apparatus and a control method thereof, and more specifically, to a display apparatus coupled with a dongle and a control method thereof.

2. Description of Related Art

With the development of electronic technology, various electronic apparatuses are being developed. In particular, recently, electronic apparatuses such as televisions (TVs) capable of executing various applications are being developed. The electronic apparatuses may store operating system (OS) based applications of the electronic apparatus in a memory, and execute applications selected based on a user command to provide various services such as web surfing services, image playback services, and social networking services.

Users tend to desire much more variety in service. For example, a user may, through an electronic apparatus, desire to enjoy not only a service provided by an OS-based application of the electronic apparatus, but also a service provided by an OS-based application different from the OS of the electronic apparatus.

However, the electronic apparatuses developed to date have been disadvantageous for not being able to provide services provided by different OS-based applications other than the OS-based applications of the electronic apparatus, thus resulting in not being able to satisfy the needs of users wishing to enjoy a variety of services through various applications based on various OS.

SUMMARY

Provided are a display apparatus which displays an execution screen of an application executed in a dongle installed with an OS different from the display apparatus, and at this time, couples an electronic apparatus capable of inputting a user command to an executed application with a dongle and a control method thereof.

In accordance with an aspect of the disclosure, a display apparatus includes a display, an interface, and a processor configured to, based on a dongle in which an application is stored being connected to the interface, display the application stored in the dongle on the display based on information on the application received from the dongle, based on receiving a user command for selecting the application displayed on the display, transmit a command for executing the selected application to the dongle through the interface, and based on receiving an execution screen of the application executed in the dongle through the interface according to the command, display the received execution screen on the display, the processor is further configured to, based on receiving the user command, transmit, through the interface, a command for communicating with the electronic apparatus to the dongle, so that the dongle is connected to the electronic apparatus according to the command.

In accordance with an aspect of the disclosure, the display apparatus may further include a communicator, and the processor may be configured to, based on receiving the user command for selecting the displayed application from the electronic apparatus while the display apparatus is connected to the electronic apparatus through the communicator, control the communicator to be disconnected from the electronic apparatus.

The processor may be configured to, based on the application executed in the dongle being terminated according to the user command input to the electronic apparatus connected to the dongle, control the communicator to be connected to the electronic apparatus.

The processor may be configured to, based on receiving an execution screen of the application based on the user command input to the electronic apparatus connected to the dongle through the interface, display the received execution screen on the display.

The application stored in the dongle may be a first OS-based application, and the processor is further configured to display the first OS-based application and a second OS-based application stored in the display apparatus on the display, and based on receiving the user command for selecting the first OS-based application among the plurality of displayed applications, transmit, through the interface, a command for executing the selected application to the dongle.

The first OS and the second OS may be different from each other.

The interface may include a high definition multimedia interface (HDMI) interface, and the processor may be configured to transmit, through an HDMI consumer electronics control (HDMI-CEC) of the HDMI interface, a command for executing the selected application and a command for communicating with the electronic apparatus to the dongle.

In accordance with an aspect of the disclosure, a control method of a display apparatus includes, receiving information on an application stored in a dongle from the dongle connected to the display apparatus, displaying the application stored in the dongle based on the received information on the application, based on receiving a user command for selecting the displayed application, transmitting a command for executing the selected application to the dongle, and transmitting a command for communicating with the electronic apparatus to the dongle, so that the dongle is connected to the electronic apparatus, and based on receiving an execution screen of the application executed in the dongle, displaying the received execution screen.

The control method In accordance with an aspect of the disclosure may, based on receiving the user command for selecting the displayed application from the electronic apparatus while the display apparatus is connected to the electronic apparatus, disconnecting a communication connection with the electronic apparatus.

The control method In accordance with an aspect of the disclosure may, based on the application executed in the dongle being terminated according to the user command input to the electronic apparatus connected to the dongle, connecting the display apparatus with the electronic apparatus.

The displaying the received execution screen includes, based on receiving an execution screen of the application according to the user command input to the electronic apparatus connected to the dongle, displaying the received execution screen.

The application stored in the dongle is a first OS-based application, the displaying the application includes displaying the first OS-based application and a second OS-based application stored in the display apparatus, and the transmitting includes, based on receiving a user command for selecting the first OS-based application of the plurality of displayed applications, transmitting a command for executing the selected application to the dongle.

The first OS and the second OS may be different from each other.

The transmitting includes transmitting, through an HDMI-CEC, a command for executing the selected application and a command for communicating with the electronic apparatus to the dongle.

In accordance with an aspect of the disclosure, the display apparatus may, in addition to the application stored in the display apparatus, display an execution screen of an application executed in a dongle, which operates based on an OS different from the display apparatus. Accordingly, a user may be provided with an execution screen of various OS-based applications through the display apparatus.

Based on the application stored in the dongle being executed, the electronic apparatus capable of inputting the user command to the application, which is executed in the dongle, may be communicatively coupled with the dongle automatically, and thus improve user convenience.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 10 is a flowchart illustrating a control method of a display apparatus according to an embodiment.

DETAILED DESCRIPTION

Figure 1A:
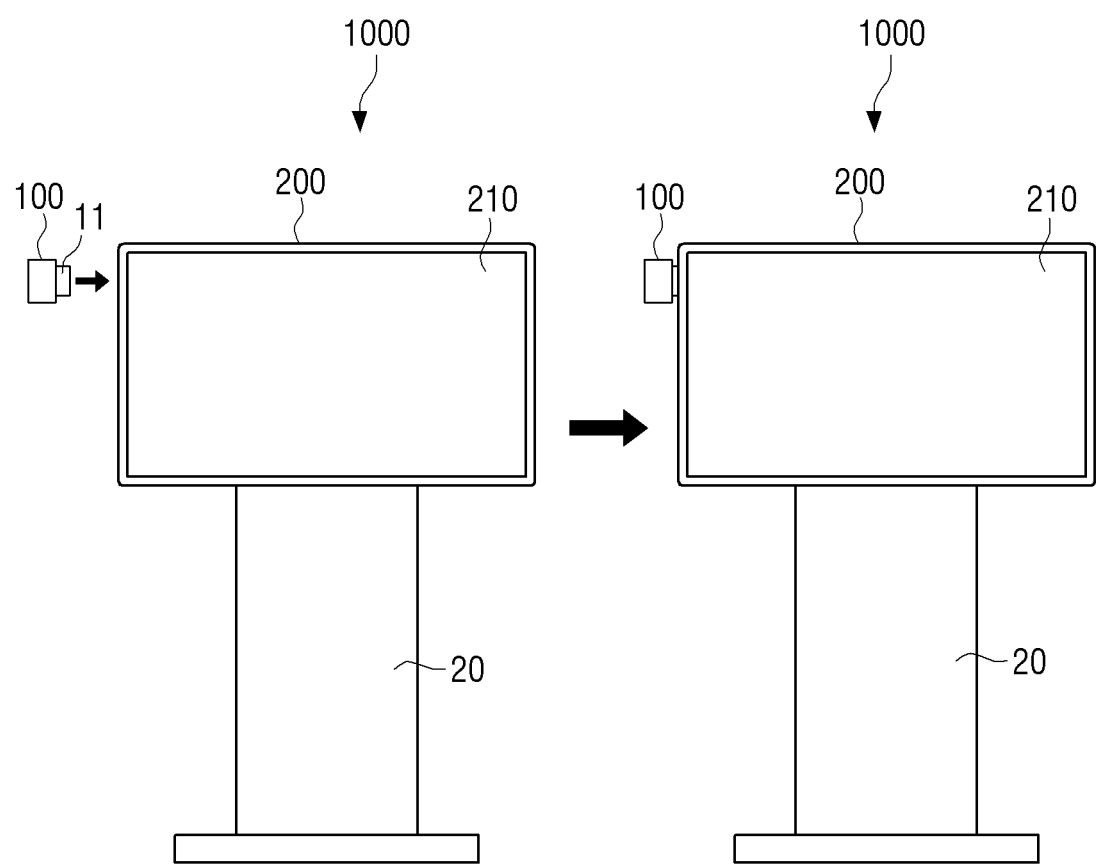
FIG. 1A is a diagram illustrating a display system according to an embodiment.

Certain embodiments will be described with reference to the accompanying drawings. However, it should be noted that embodiments are not limiting, and should be interpreted to include all modifications, equivalents and/or alternatives. In the drawings, like reference numerals may be used for like elements.

It should be understood that terms such as "comprise," "may comprise," "consist of," or "may consist of" used herein are to designate a presence of a characteristic (e.g., element of a number, a function, an operation, a component, or the like), and not to preclude a presence or a possibility of adding one or more of other characteristics.

Herein, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one of A, (2) at least one of B, or (3) both at least one of A and at least one of B.

As used herein, the terms "1st" or "first" and "2nd" or "second" may use corresponding components regardless of importance or order, and are used only to distinguish one component from another without limiting the components.

When a certain element (e.g., first element) is indicated as being "(operatively or communicatively) coupled with/to" or "connected to" another element (e.g., second element), it may be understood as the certain element being directly coupled with/to the other element or as being coupled through still another element (e.g., third element). On the other hand, when a certain element (e.g., first element) is indicated as "directly coupled with/to" or "connected to" another element (e.g., second element), it may be understood as a still another element (e.g., third element) not being present between the certain element and the other element.

The terms "module" or "part" used herein perform at least one function or operation, and may be implemented as a hardware or software, or a combination of hardware and software. Further, a plurality of "modules" or a plurality of "parts," except for a "module" or a "part" which needs to be implemented to a specific hardware, may be integrated to at least one module and implemented in at least one processor.

The expression "configured to . . . (or set up to)" used herein may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a processor configured to (or set up to) perform A, B, or C" may mean a dedicated processor (e.g., embedded processor) for performing a corresponding operation, or a generic-purpose processor (e.g., a central processing unit (CPU) or an application processor) capable of performing the corresponding operations by executing one or more software programs stored in the memory device.

FIG. 1 is a diagram illustrating a display system according to an embodiment.

Figure 1B:
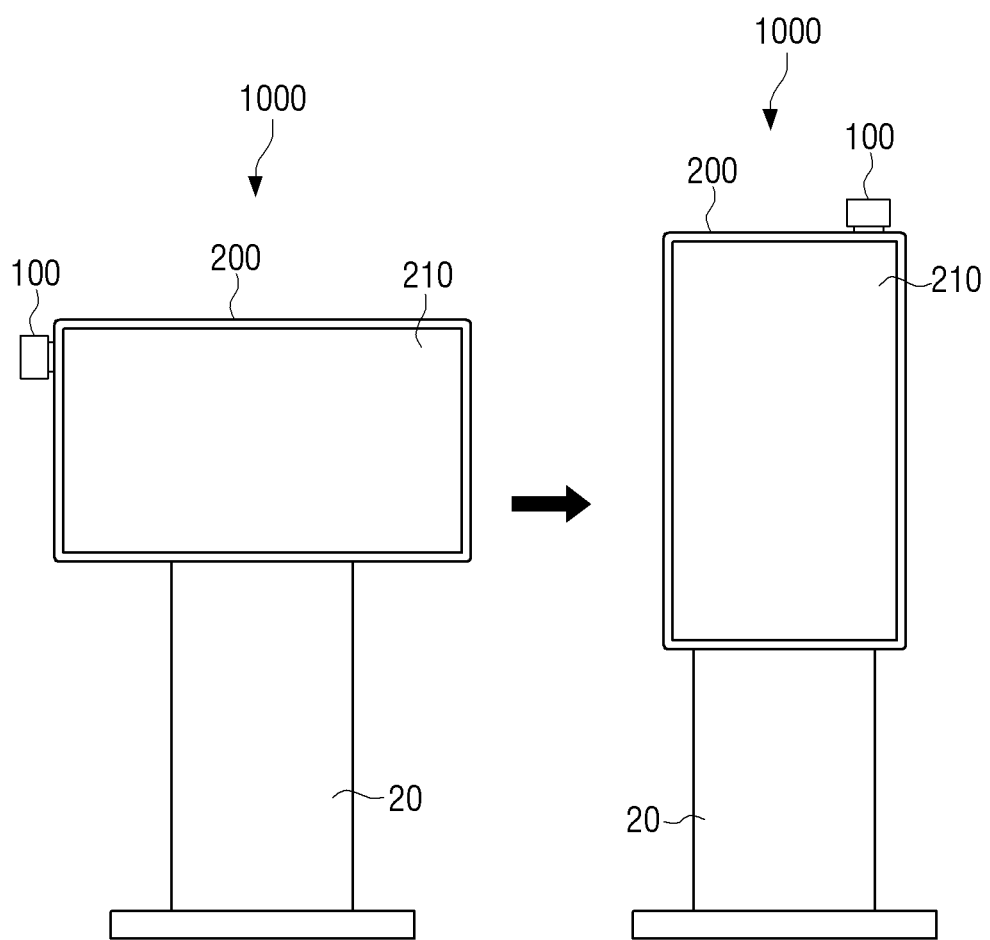
FIG. 1B is a diagram illustrating a display system according to an embodiment.
Figure 1C:
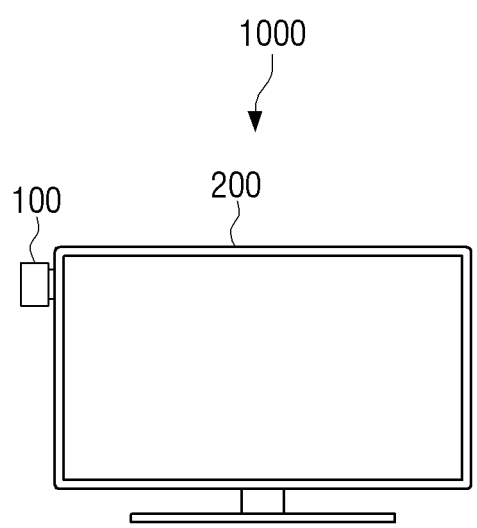
FIG. 1C is a diagram illustrating a display system according to an embodiment.

Referring to FIGS. 1A and 1B, the display system 1000 according to an embodiment may include a dongle 100 and a display apparatus 200.

As illustrated in FIG. 1A, the dongle 100 may be connected to the display apparatus 200. For example, an HDMI connector 11 provided in the dongle 100 may be connected to an HDMI port provided in the display apparatus 200.

The display apparatus 200 and the dongle 100 may perform communication through an HDMI communication method.

The display apparatus 200 may be implemented as a TV. In one example, as shown in FIG. 1B, the display apparatus 200 may be a TV including a display 210 which is rotatable. The display 210 may be coupled to a stand 20, and may be rotated from a horizontal direction to a vertical direction or rotated from a vertical direction to a horizontal direction. The display apparatus 200 may include a motor and the like for rotating the display 210.

The display apparatus 200 may display various images using the display 210 disposed in the horizontal direction or the vertical direction.

However, this is merely an example, and the display apparatus 200 may be implemented as a TV and the like which does not rotate.

The display apparatus 200 may display a user interface screen using an OS of the display apparatus 200 stored (or, installed, loaded) in the display apparatus 200 on the display 210. The OS of the display apparatus 200 may be an OS used in TV such as Tizen.

For example, the display apparatus 200 may display a home screen provided by the OS of the display apparatus 200 on the display 210.

The home screen may be a screen basically provided by the OS for the search and execution of functions provided in the display apparatus 200.

The home screen may include a variety of graphical user interfaces (GUIs). For example, the home screen may include a graphical user interface (GUI) for selecting an input source of the display apparatus 200, a GUI representing an application stored (or, installed) in the display apparatus 200, and the like.

The display apparatus 200 may perform various operations based on a user command input through the home screen.

For example, the display apparatus 200 may, when the user command for selecting a GUI representing an input source which is connected with the set-top box is input, display an image received from the set-top box on the display 210.

In another example, the display apparatus 200 may, when the user command for selecting a GUI representing an application which provides a moving image service is input, execute the selected application, connect to a server which provides a service through the executed application, and display, by using the executed application, an image received from the server on the display 210.

The display apparatus 200 may receive an image from various external sources, and display the received image on the display 210.

In addition, the display apparatus 200 may receive an image from the dongle connected to the display apparatus 200, and display the received image on the display 210.

The dongle 100 may execute the application stored in the dongle 100 by using the OS stored (or, installed, loaded) in the dongle 100, and transmit an execution screen (i.e., image or media content provided by the application) of the application to the display apparatus 200.

The dongle 100 is described above as being implemented in an apparatus without a display and directly connected to the display apparatus 200 as an example, but an embodiment is not limited thereto. According to an embodiment, the dongle 100 may include a display, and may also be connected with the HDMI port of the display apparatus 200 through a separate adapter.

Specifically, as described above, an OS installed in the dongle 100 may be different from the OS installed in the display apparatus 200, and the dongle 100 may be connected with the display apparatus 200 through the HDMI communication method. Accordingly, by connecting a portable terminal device (e.g., smartphone) in which an OS different from the display apparatus 200 is installed to the HDMI port of the display apparatus, the display system 1000 according to an embodiment may be configured.

The portable terminal device such as a smartphone may include a universal serial bus (USB) port, but might not include the HDMI port. Accordingly, by connecting the portable terminal device to the HDMI port of the display apparatus 200 through an adapter which includes both a USB connector and an HDMI connector, the display system 1000 according to an embodiment may also be configured. The adapter may be in a cable type or a dock type, but is not limited thereto.

Figure 1D:
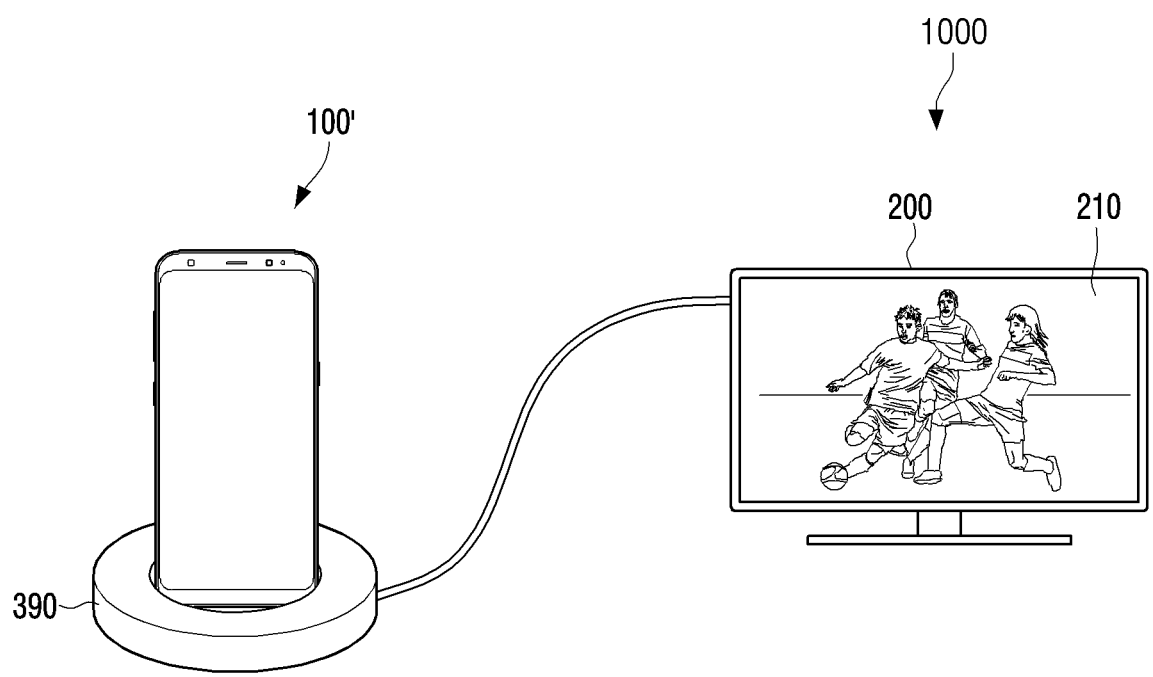
FIG. 1D is a diagram illustrating a display system according to an embodiment.

FIG. 1D illustrates an example of a smartphone 100' connected to the display apparatus 200 which is a TV, through an adapter 390, e.g., a dock type adapter, according to an embodiment.

The adapter 390 may include the USB connector which is connected to the USB port of the smartphone 100' and the HDMI connector which is connected to the HDMI port of the TV.

The smartphone 100' in which an OS different from the OS of the TV is installed, may perform communication with the TV through the adapter 390 with the HDMI communication method. The adapter 390 and the smartphone 100' which are connected with each other through a USB interface may be capable of performing the same function as the dongle 100 according to embodiments.

Figure 2:
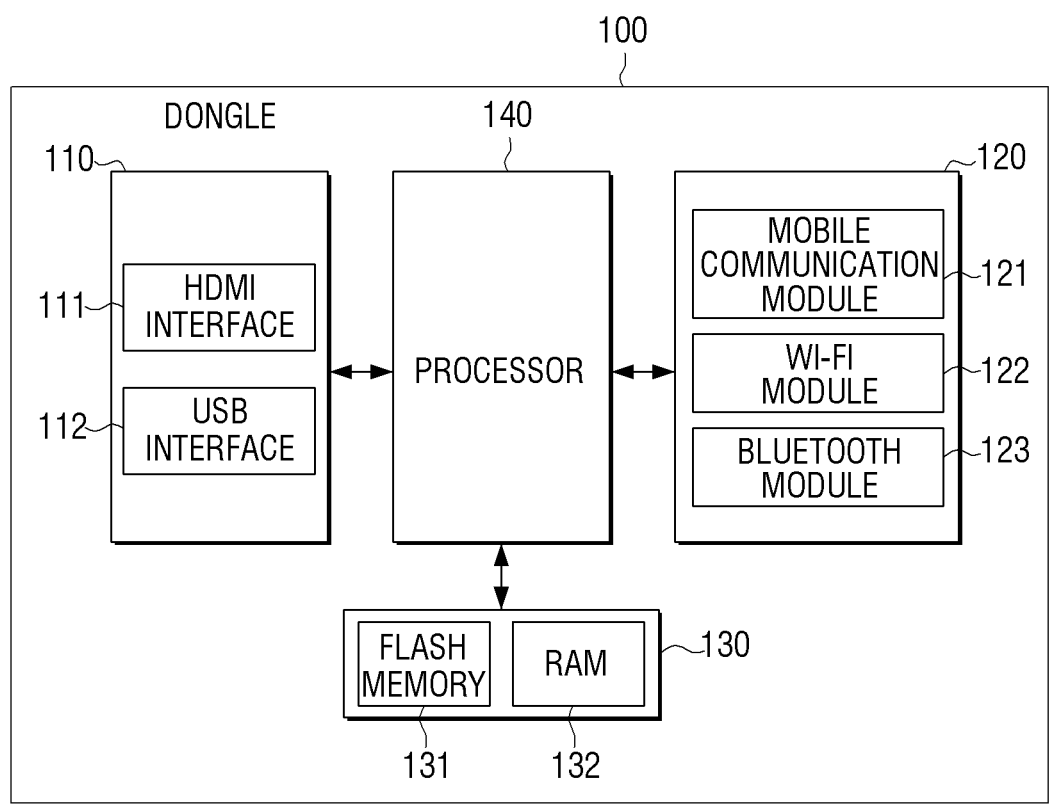
FIG. 2 is a block diagram illustrating a configuration of a dongle according to an embodiment.

FIG. 2 is a block diagram illustrating a configuration of a dongle according to an embodiment.

Referring to FIG. 2, the dongle 100 according to an embodiment may include an interface 110, a communicator 120, e.g., a wireless interface or a wired interface, a memory 130, and a processor 140.

The interface 110 may be connected to the display apparatus 200. In one example, the interface 110 may be connected to the display apparatus using various communication methods such as an HDMI and a USB.

The interface 110 may include the HDMI interface 111 including the HDMI connector and/or the HDMI port for HDMI communication, and the USB interface 112 including the USB connector and/or the USB port for USB 2.0 communication or USB 3.0 communication. The interface 110 may be directly connected to the display apparatus 200 or connected to the display apparatus 200 through a separate cable.

The communicator 120 may perform communication with an external device by using use various communication methods such as a mobile communication, Wi-Fi, and Bluetooth.

The communicator may include a mobile communication module 121 for mobile communication such as 3rd generation (3G), 3rd generation partnership project (3GPP), long term evolution (LTE), and 5th generation (5G), a Wi-Fi module 122 for Wi-Fi communication and a Bluetooth module 123 for Bluetooth communication.

The mobile communication module 121 may perform communication with a server by connecting to the internet through a mobile communication network, and the Wi-Fi module 122 may be connected with an access point and perform communication with the server by connecting to the internet through the access point. The Bluetooth module 123 may perform communication with a device located in the periphery of the dongle 100.

The memory 130 may store various instructions, software programs, and the like related to the operation of the dongle 100. The memory 130 may include a flash memory 131 and a random access memory (RAM) 132.

The processor 140 may control the overall operation of the dongle 100. That is, the processor 140 may be electrically connected to the interface 110, the communicator 120, and the memory 130, and control the elements thereof.

The processor 140 may include a CPU or an application processor (AP), and may execute one or more software programs stored in the memory 130 based on the one or more instructions stored in the memory 130.

For example, the processor 140 may, when power is applied to the dongle 100, use the RAM 132 to drive the OS stored in the flash memory 131. The OS may be an OS such as an Android which is used in portable devices such as a smartphone and a tablet.

The power applied to the dongle 100 may be provided from the display apparatus 200 connected to the dongle 100 through the USB interface 112. However, the dongle 100 may also include a separate battery according to an embodiment.

The processor 140 may, through the OS, load an application stored in the flash memory 131 to the RAM 132 and execute the application.

The application may be an application program which is executed based on the OS of the dongle 100. For example, if the OS installed in the dongle 100 is an Android, the application may be an application program which is executable in the Android. The application may be stored in the memory 130 during the manufacturing stage of the dongle 100, or downloaded from a server (i.e., PLAYSTORE™, etc.) that provides an application based on the user command and stored in the memory 130.

The command for executing the applications stored in the dongle 100 may be received from the display apparatus 200.

An example of the dongle 100 being connected to the display apparatus 200 through the HDMI interface 111 is described below in detail.

Specifically, when the dongle 100 is connected to the display apparatus 200 through the HDMI interface 111, the processor 140 may transmit information on the application stored in the memory 130 to the display apparatus 200 through the HDMI interface 111.

The processor 140 may transmit information on the application stored in the memory 130 to the display apparatus 200 through the HDMI-CEC of the HDMI interface 111.

The information on the application may include information for identifying applications such as a name of application.

The display apparatus 200 may, by using the information on the application received from the dongle 100, display a GUI corresponding to the application stored in the dongle 100 on the display 210.

The display apparatus 200 may identify the application stored in the dongle 100 by using the received information and display a home screen including a GUI representing the identified application on the display 210.

The display apparatus 200 may then, when a GUI is selected, transmit a command for requesting the execution of an application corresponding to the selected GUI to the dongle 100.

The display apparatus 200 may transmit a command for requesting the execution of the application to the dongle 100 through the HDMI CEC.

Accordingly, when a command for requesting the execution of the application is received, the processor 140 may execute the application based on the received request and transmit the execution screen of the application to the display apparatus 200 through the HDMI interface 111.

For example, the processor 140 may perform communication with the server providing the service through the mobile communication module 121 or the Wi-Fi module 122 and transmit the image received from the server to the display apparatus 200 through the mobile communication module 121 or the Wi-Fi module 122 by executing the application based on the received request. In another example, the processor 140 may execute the application based on the received request and transmit the image provided by the application to the display apparatus 200.

The display apparatus 200 may display the execution screen of the application received from the dongle 100 on the display 210.

According to an embodiment, the display apparatus 200 may, in addition to the application stored in the display apparatus 200, display an execution screen of an application executed in the dongle 100 which operates based on an OS different from an OS of the display apparatus 200 on the display 210. Accordingly, the user may be provided with various OS-based application execution screens through the display apparatus 200.

The dongle 100 may operate based on an OS used by the user in portable devices such as a smartphone and a tablet, and in terms of storing and executing the corresponding OS-based application, the user may control the display apparatus 200 through a more experienced manipulation.

The user command on the application executed in the dongle 100 may be input through the electronic apparatus which is wirelessly connected to the dongle 100. The electronic apparatus may be an input device such as a remote controller, a keyboard, a mouse, and a game controller.

Figure 3A:
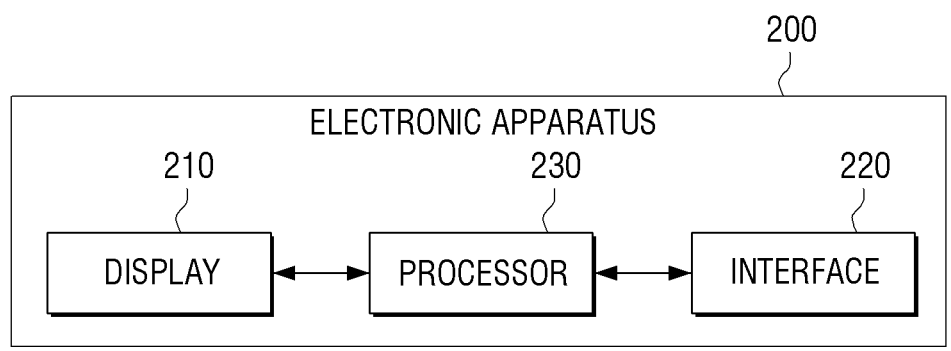
FIG. 3A is a block diagram illustrating a configuration of a display apparatus according to an embodiment.

FIG. 3A is a block diagram illustrating a configuration of a display apparatus according to an embodiment.

Referring to FIG. 3A, the display apparatus 200 may include a display 210, an interface 220, and a processor 230.

The display 210 may display various images. The display 210 may be implemented as various display types such as a liquid crystal display (LCD), a light emitting diode (LED), an organic LED (OLED), and a quantum dot LED (QLED).

The interface 220 may be connected with various external devices. In an example, the interface 220 may be connected with an external device by using various communication methods, such as HDMI and USB.

The interface 220 may include an HDMI interface including at least one HDMI port for HDMI communication and a USB interface including a USB port for USB 2.0 communication and/or USB 3.0 communication.

The external device may include a dongle 100, a set-top box, and the like. The HDMI interface may include a plurality of HDMI ports, and the dongle 100 and the set-top box may be respectively connected through each HDMI port. In addition, according to an embodiment, the dongle 100 may be connected to the USB port.

The processor 230 may control the overall operation of the display apparatus 200. That is, the processor 230 may be electrically connected to the display 210 and the interface 220, and control the elements thereof.

The processor 230 may include a CPU or an AP, and may be configured to execute one or more software programs stored in the memory based on one or more instructions stored in the memory of the display apparatus 200.

For example, when power is applied to the display apparatus 200, the processor 230 may drive the OS stored in the memory. The OS may be an OS used in TVs such as Tizen.

The processor 230 may then display a user interface screen provided in the OS on the display 210.

For example, the processor 230 may display a home screen provided by the OS on the display 210. The home screen may include a GUI for selecting an input source of the display apparatus 200, a GUI representing the application stored in the display apparatus 200, and the like.

The input source may include an HDMI interface, a USB interface, and the like to which the external device is connected.

The application may be an application program executed based on the OS of the display apparatus 200. For example, if the OS installed in the display apparatus 200 is Tizen, the application may be an application program which may be executable in Tizen. The application may be stored in memory during the manufacturing stage of the display apparatus 200 or downloaded from the server, which provides the application based on the user command, and stored in the memory.

The processor 230 may, when the user command for selecting the GUI displayed on the home screen is received, perform an operation corresponding to the selected GUI.

For example, the processor 230 may, when the user command for selecting the GUI representing the HDMI interface is input, display an image received from the HDMI interface on the display 210.

In another example, the processor 230 may, when the user command for selecting the GUI representing the application which provides the moving image is input, connect to the server providing the service through the application by executing the selected application, and display, by using the executed application, the image received from the server on the display 210. The display apparatus 200 may include a communicator capable of connecting to the internet and performing communication with the server.

The processor 230 may display the application stored in the display apparatus 200 and the GUI representing the application stored in the dongle 100 on the home screen.

Specifically, while the dongle 100 in which the applications is stored is connected to the interface 220, the processor 230 may display the application stored in the dongle 100 on the display 210 based on information on the application received from the dongle 100.

The application stored in the dongle 100 may be a first OS-based application. For example, the application stored in the dongle 100 may be an application executable in the Android, which is an OS installed in the dongle 100.

The information on the application may include information for identifying an application such as the name of the application. The information on the application may be received through the HDMI CEC of the HDMI interface.

The processor 230 may determine (or, identify) the application stored in the dongle 100 based on information on the application received from the dongle 100, and display the GUI representing the application stored in the dongle 100 on the display 210 using an image data on the GUI representing the identified application.

The image data may be stored in the memory of the display apparatus 200 per application, or may be received from the dongle 100 or an external server.

The processor 230 may display the first OS-based application and a second OS-based application stored in the display apparatus 200 on the display 210.

The first OS stored in the dongle 100 and the second OS stored in the display apparatus 200 may be different OS. In an example, as described above, the first OS may be an Android, and the second OS may be a Tizen. However, this is merely an example, and the dongle 100 may be stored with any one of the OS of the various OS used in the portable device, and, the display apparatus 200 may be stored with any one OS of the various OS used in the TV.

Figure 3B:
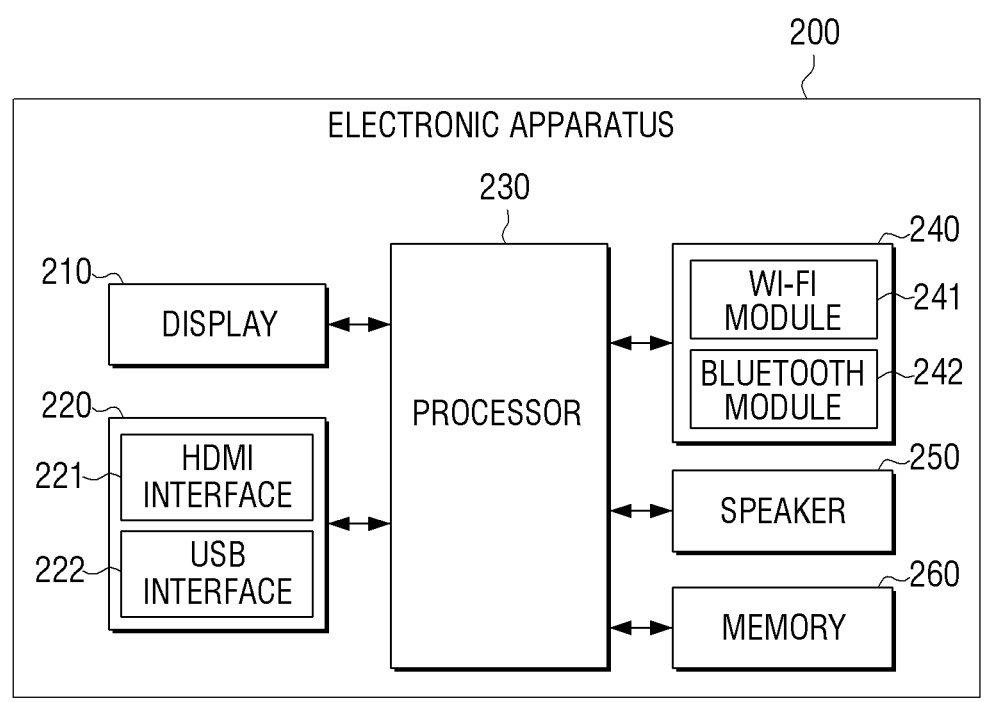
FIG. 3B is a block diagram illustrating a detailed configuration of a display apparatus according to an embodiment.

FIG. 3B is a block diagram illustrating a detailed configuration of a display apparatus according to an embodiment.

Referring to FIG. 3B, the display apparatus 200 according to an embodiment may include a display 210, an interface 220, i.e., a first interface, a processor 230, a communicator 240, i.e., a second interface, a speaker 250, and a memory 260.

The elements illustrated in FIG. 3B are merely one example, and at least some elements may be omitted based on an embodiment.

Because the display 210, the interface 220, and the processor 230 perform the same functions as in an embodiment of FIG. 3A, redundant descriptions will be omitted.

The interface 220 may include an HDMI interface 221 and a USB interface 222.

The HDMI interface 221 may include at least one HDMI port for HDMI communication, and the USB interface 222 may include a USB port for USB 2.0 communication and/or USB 3.0 communication.

The HDMI interface 221 and the USB interface 222 may be connected with various external devices such as a dongle 100 and a set-top box, and the processor 230 may display an image received from an external device which is respectively connected with the HDMI interface 221 and the USB interface 222 on the display 210, and output an audio received from the external device through the speaker 250.

The interface 220 may further include an Ethernet terminal for connecting with a component terminal, an optical terminal, and a LAN cable in addition to the HDMI interface 221 and the USB interface 222.

The communicator 240 may perform communication with the external device. The communicator 240 may include a Wi-Fi module 241 for Wi-Fi communication and a Bluetooth module 242 for Bluetooth communication.

The Wi-Fi module 241 may be connected to an access point, and perform communication with the server by connecting to the internet through the access point. The processor 230 may execute the application stored in the memory 260 based on the user command to connect to the server providing the service through the corresponding application, and receive various data such as an image from the server through the Wi-Fi module 241.

The Bluetooth module 242 may perform communication with the device located in the periphery of the display apparatus 200. The processor 230 may, by performing pairing with an electronic apparatus such as a device (i.e., remote controller, etc.) located in the periphery of the display apparatus 200, control the Bluetooth module 242 to be communication connected with the electronic apparatus.

The communicator 240 may include a LAN module. The LAN module may perform communication with the server by connecting to the internet through a LAN cable coupled to the Ethernet terminal. The processor 230 may execute the application stored in the memory 260 based on the user command to connect to the server providing the service through the corresponding application, and receive various data such as an image from the server through the LAN module.

The speaker 250 may output various audios. The processor 230 may output audio received from the dongle 100, the set-top box, the server, and the like through the speaker 250.

The memory 260 may store various instructions, software programs, data, and the like.

The processor 230 may execute one or more software programs stored in the memory 260 based on one or more instructions stored in the memory 260, and control the overall operations of the display apparatus 200.

For example, the processor 230 may drive the OS stored in the memory 260, and display the home screen provided by the OS on the display 210. The processor 230 may then execute the application in the memory 260 through the OS, and display the execution screen of the application on the display 210.

Figure 4:
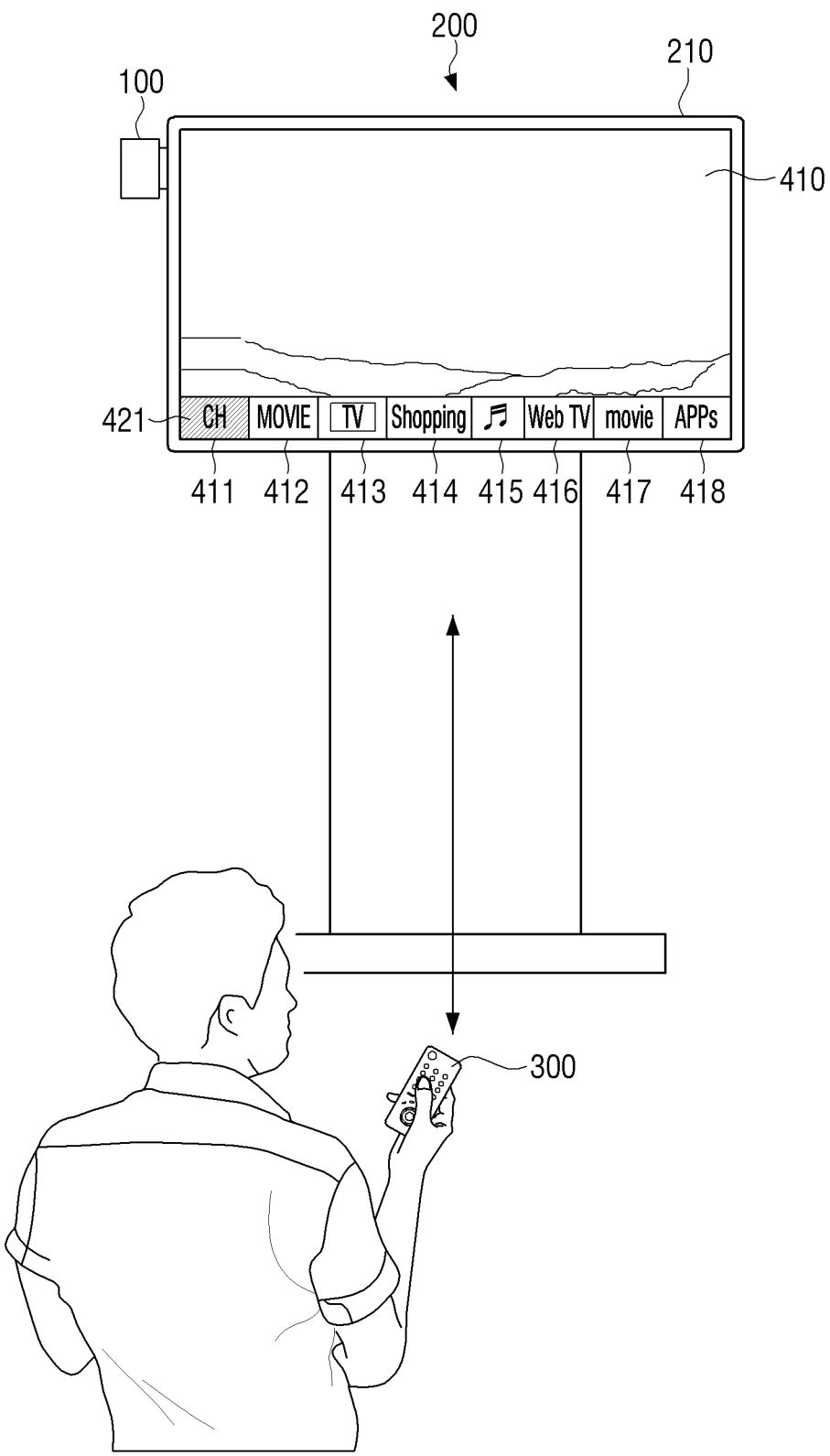
FIG. 4 is a diagram illustrating a user interface screen displayed on a display apparatus according to an embodiment.

For example, as shown in FIG. 4, the processor 230 may display a home screen 410 including a plurality of GUIs 411, 412, 413, 414, and 415 representing a plurality of applications stored in the display apparatus 200 and a plurality of GUIs 416, 417, and 418 representing the plurality of applications stored in the dongle 100 on the display 210.

The processor 230 may, when the user command for selecting the application stored in the dongle 100 is received, transmit, through the interface 220, the command for executing the selected application to the dongle 100.

The processor 230 may, when the user command for selecting the first OS-based application stored in the dongle 100 of the plurality of applications displayed on the display 210 is received, transmit, though the interface 220, the command for executing the selected application to the dongle 100.

The user command for selecting the application may be received from the electronic apparatus which is connected with the display apparatus 200. The display apparatus 200 may include a communicator for performing communication with the electronic apparatus. The electronic apparatus may include a Bluetooth module for performing communication with the periphery devices.

The processor 230 may control the communicator to be connected with the electronic apparatus by performing pairing. The processor 230 may then, when the user command input to the electronic apparatus is received through the communicator, perform an operation corresponding to the received user command.

Figure 5:
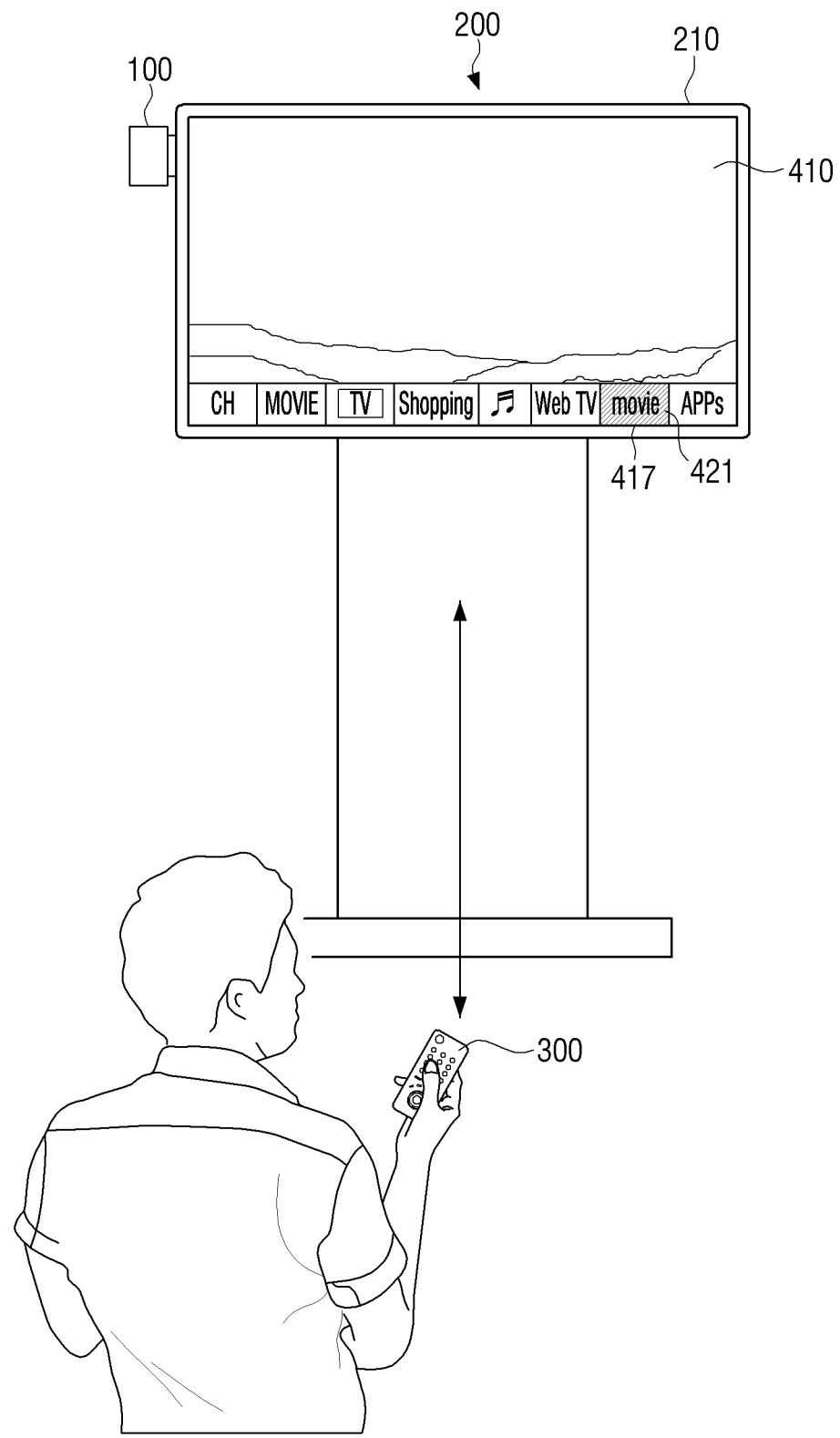
FIG. 5 is a diagram illustrating a user interface screen displayed on a display apparatus according to an embodiment.

For example, as shown in FIGS. 4 and 5, the electronic apparatus which is connected with the display apparatus 200 may, for example, receive the user command from the remote controller 300.

The processor 230 may, when the user command for pressing a direction key of the remote controller 300 is received, move a highlight displayed on the GUI of the home screen 410 to another GUI. For example, as shown in FIGS. 4 and 5, the processor 230 may move the highlight 421 displayed on the GUI 411 to a GUI 417 based on the user command pressing the direction key of the remote controller 300.

The processor 230 may then, when the user command for pressing the select key of the remote controller 300 is received, identify the GUI at which the highlight is located as being selected according to the user command.

The processor 230 may identify whether the application corresponding to the selected GUI corresponds to the application stored in the display apparatus 200 or to the application stored in the dongle 100.

The processor 230 may, if the application represented by the selected GUI corresponds to the application stored in the display apparatus 200, execute the application by using the second OS, connect to the server through the communicator of the display apparatus 200, and display the image provided by the server on the display 210 through the executed application.

The processor 230 may, if the application represented by the selected GUI corresponds to the application stored in the dongle 100, transmit the command for executing the application to the dongle 100. For example, as shown in FIG. 5, if the GUI 417 is a GUI of the application stored in the dongle 100, the processor 230 may, when the GUI 417 is selected, transmit the command for executing the application corresponding to the GUI 417 to the dongle 100 through the interface 220.

The command for executing the application may be a command for requesting the application selected according to the user command be executed.

The processor 230 may be configured to transmit the command to the dongle 100 through the HDMI CEC of the HDMI interface.

In the above-described example, the highlight is described as being moved according to the direction key of the electronic apparatus, but this is merely an example, and the processor 230 may display a cursor on the home screen, and the movement of the cursor or the highlight may be controlled by the movement of the electronic apparatus. The electronic apparatus may include a sensor for sensing movement of the electronic apparatus, and transmit a signal on the movement of the electronic apparatus sensed by the sensor to the display apparatus 200.

The processor 230 may, when the user command for selecting the application stored in the dongle 100 is received, transmit a command for communicating with the electronic apparatus so that the dongle 100 is connected with the electronic apparatus to the dongle 100 through the interface 220.

The command for communicating with the electronic apparatus may be a command requesting for the dongle 100 (i.e., the Bluetooth module 123 of the dongle 100) to perform connecting with the peripheral devices.

The processor 230 may control the communicator of the display apparatus 200 to disconnect from the electronic apparatus. That is, the processor 230 may, when the user command for selecting the application from the electronic apparatus is received while the display apparatus 200 is connected with the electronic apparatus through the communicator, control the communicator to disconnect from the electronic apparatus.

The processor 140 of the dongle 100 may receive the above-described command from the display apparatus 200 through the interface 110 (i.e., HDMI interface 111).

The processor 140 may execute an application selected based on the user command input to the display apparatus 200 of the at least one application stored in the dongle 100. The processor 140 may then transmit an execution screen of the application to the display apparatus 200 through the interface 110.

The processor 140 may control a Bluetooth module 123 to perform communication connecting with the peripheral devices of the dongle 100. The processor 140 may search devices located in the periphery of the dongle 100 through the Bluetooth module 123, and control the Bluetooth module 123 to be communicatively connect with the corresponding device by performing pairing with the found device, e.g., an electronic apparatus (or, a device or an electronic apparatus having previously performed pairing).

In an example of the user controlling the display apparatus 200 by using the electronic apparatus in a location adjacent to the display apparatus 200, the dongle 100 may search for the electronic apparatus to which the display apparatus 200 is not connected, and perform communication connecting with the electronic apparatus.

According to an embodiment, the processor 230 may transmit information (i.e., information for identifying electronic apparatus such as the name of the electronic apparatus) of the electronic apparatus which was communicatively connected with the communicator of the display apparatus 200 to the dongle 100 through the interface 220. The processor 140 may identify the electronic apparatus which was communicatively connected with the display apparatus 200 among the devices searched in the periphery of the dongle 100 using the information on the electronic apparatus received from the display apparatus 200, and control the Bluetooth module 123 to perform communication connecting with the identified device.

The processor 230 may, when an execution screen of the application executed in the dongle is received through the interface 220 based on a command, display the received execution screen on the display 210.

For example, as shown in FIG. 5, a GUI 417 corresponding to an application providing an image service, stored in the dongle 100 may be selected.

Figure 6:
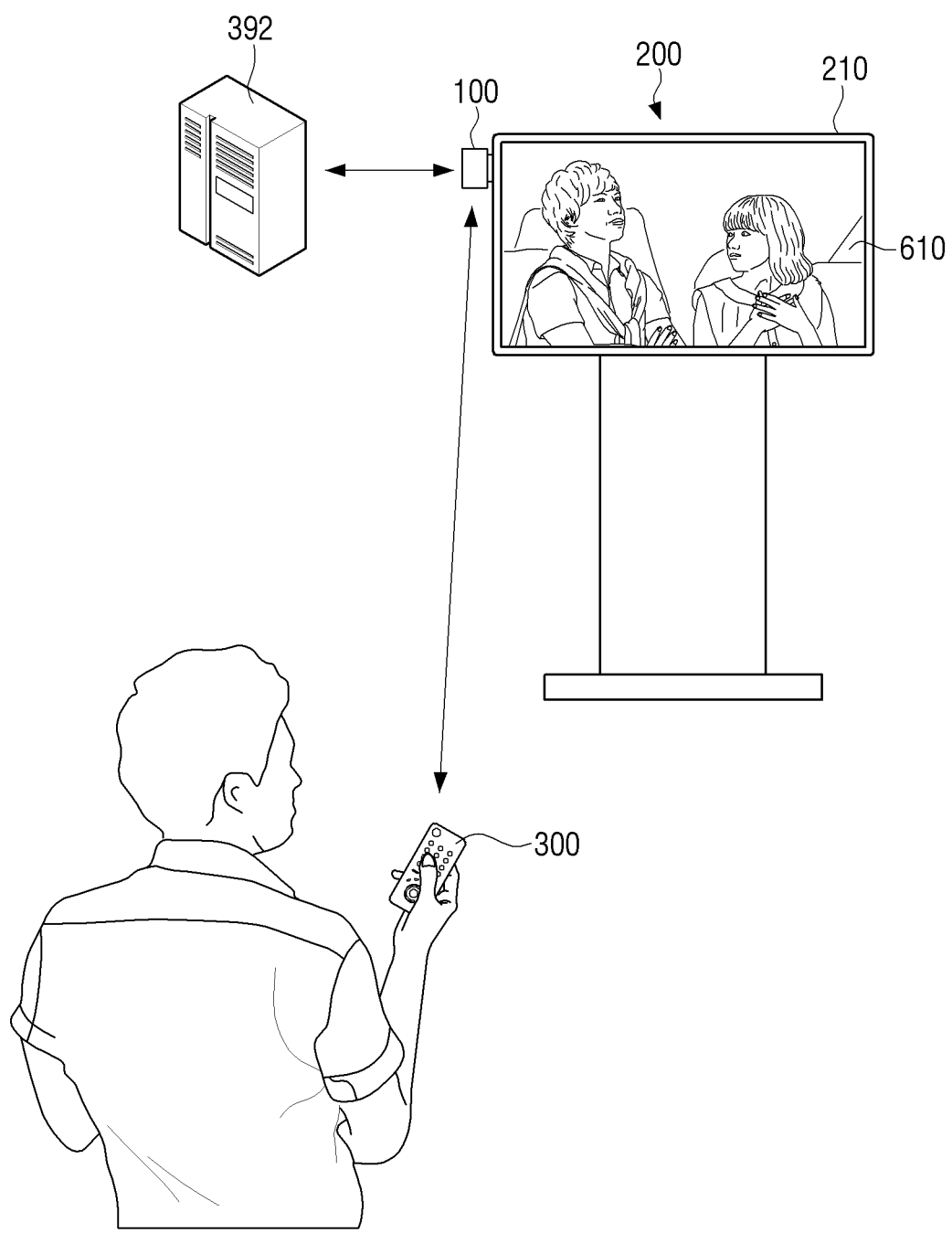
FIG. 6 is a diagram illustrating an electronic apparatus and a dongle in a coupled state when an application is executed in a dongle according to an embodiment.

As shown in FIG. 6, the processor 140 of the dongle 100 may connect to the server 392 through a mobile communication module 121 or a Wi-Fi module 122 by executing an application which provides an image service based on a command received from the display apparatus 200. The processor 140 may, when an image from the server 392 through the mobile communication module 121 or the Wi-Fi module 122 is received, transmit the received image to the display apparatus 200 through the interface 110.

The processor 230 may display the image 610 received from the dongle 100 on the display 210.

The processor 230 may, when an execution screen of an application which is based on the user command input to the electronic apparatus connected to the dongle 100 is received through the interface 220, display the received execution screen on the display 210.

In an example of the dongle being coupled with the electronic apparatus, the processor 140 of the dongle 100 may receive the user command which is input to the electronic apparatus by the user, from the electronic apparatus through the Bluetooth module 123 of the dongle 100, and perform an operation corresponding to the received user command through the executed application.

Figure 7:
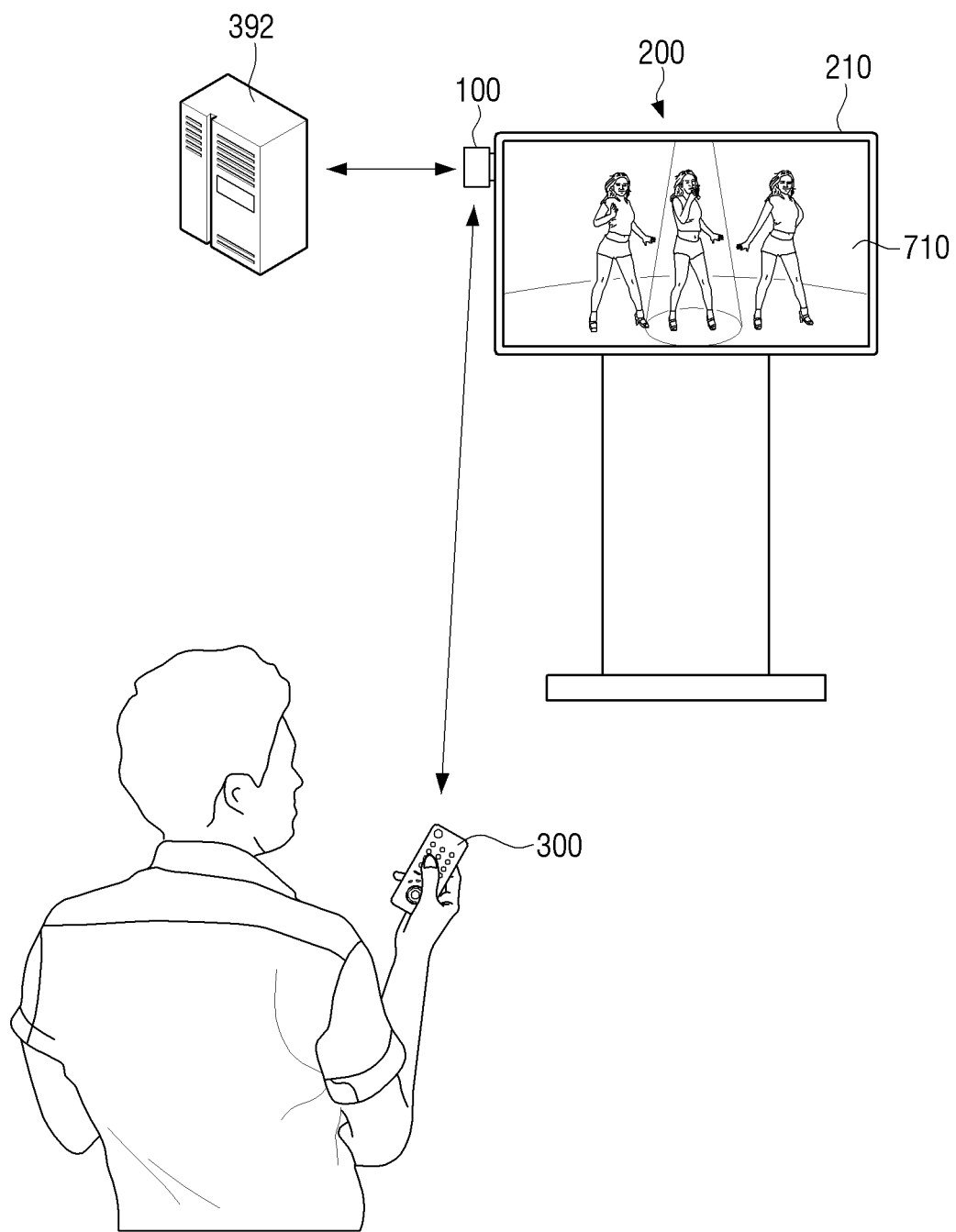
FIG. 7 is a diagram illustrating a control method for controlling an application executed in a dongle through an electronic apparatus according to an embodiment.

For example, as shown in FIG. 7, the processor 140 may, when a user command for receiving another image from the electronic apparatus is received, transmit the received user command to the server 392 through the mobile communication module 121 or the Wi-Fi module 122. The processor 140 may, when an image is received from the server 392 through the mobile communication module 121 or the Wi-Fi module 122, transmit the received image to the display apparatus 200 through the interface 110.

The processor 230 may display an image 710 from the dongle 100 on the display 210.

The processor 230 may, when an execution of the application executed in the dongle 100 is terminated based on a user command input to the electronic apparatus connected to the dongle 100, control the communicator of the display apparatus 200 to be connected with the electronic apparatus.

Specifically, the processor 140 of the dongle 100 may, when a user command for terminating the application is received from the electronic apparatus through the Bluetooth module 123, terminate the executed application.

The processor 140 may control the Bluetooth module 123 to disconnect from the electronic apparatus. The processor 140 may then transmit a command representing that the application is terminated to the display apparatus 200 through the interface 110.

The processor 230 may, based on receiving a command from the dongle 100 through the interface 220, control the communicator to perform communication connecting with the peripheral devices of the display apparatus 200.

The processor 230 may search devices and/or electronic apparatuses located in the periphery of the display apparatus 200 through the communicator, and control the communicator to communicatively connect with the corresponding device by performing pairing with the found device, e.g., an electronic apparatus (or, the device or the electronic apparatus having previously performed pairing).

Figure 8:
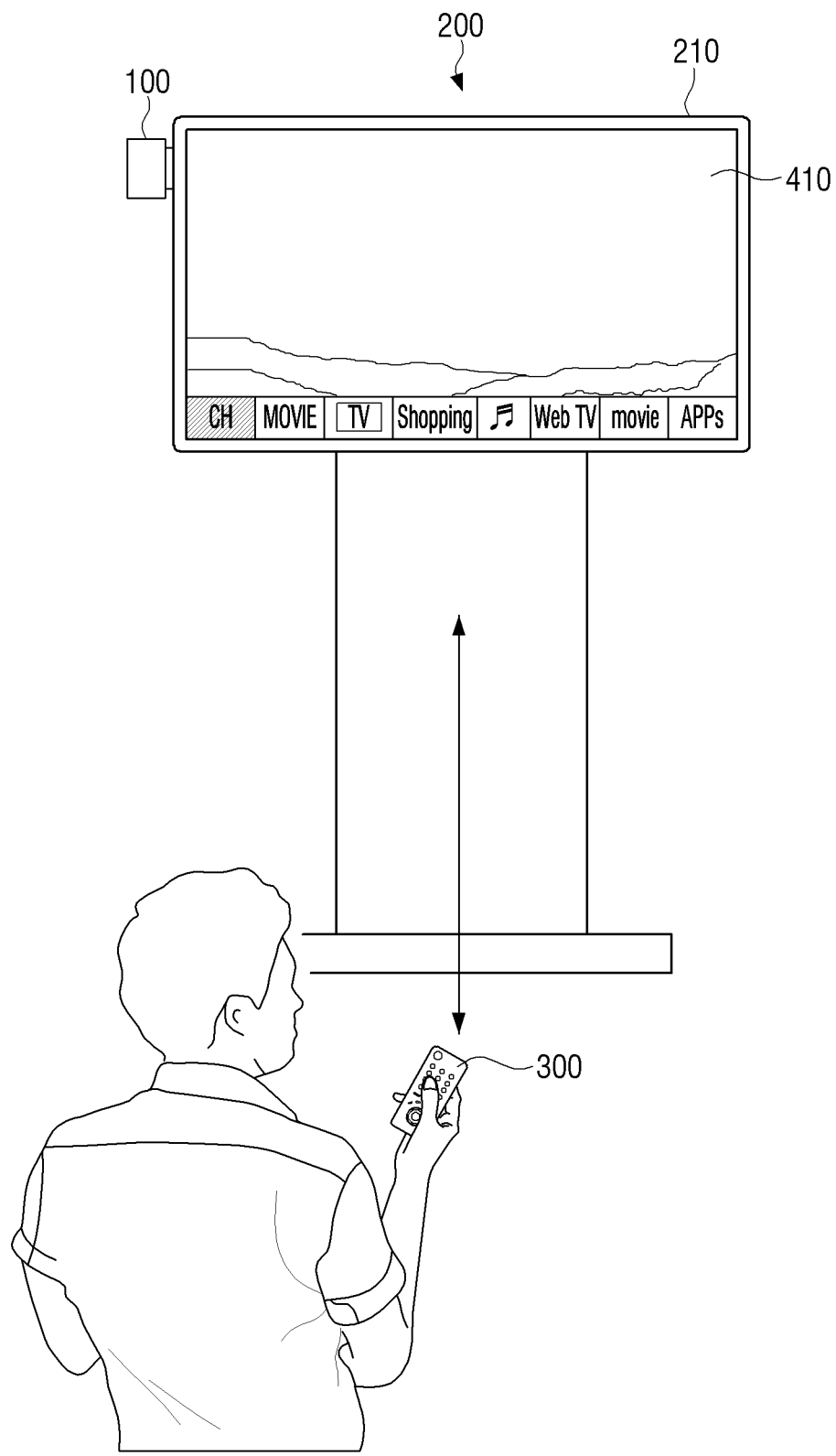
FIG. 8 is a diagram illustrating a display apparatus and a dongle being coupled when an application executed in a dongle is terminated according to an embodiment.

For example, as shown in FIG. 8, the processor 230 may, based on the application executed in the dongle 100 being terminated, display a home screen 410 on the display 210. The processor 230 may then control the communicator to perform communicative coupling with the remote controller 300 located in the periphery of the display apparatus 200.

The display apparatus 200 may be communicatively coupled with the remote controller 300, and the processor 230 may be configured to, when a user command input to the remote controller 300 is received from the remote controller 300 through the communicator, perform an operation corresponding to the received user command.

According to an embodiment, when the application stored in the dongle 100 is executed, in an example of the electronic apparatus connected to the display apparatus 200 being automatically connected to the dongle 100, the user may be able to control the dongle 100 using the electronic apparatus which is used to control the display apparatus 200. Accordingly, a user convenience may be improved.

In the above-described example, the electronic apparatus which is coupled to the display apparatus 200 is described as being automatically connected to the dongle 100, but this is merely one example.

The processor 140 of the dongle 100 may, when a command for communication connecting with the electronic apparatus is received from the display apparatus 200, use the Bluetooth module 123 to search the devices located in the periphery of the dongle 100, and transmit the information on the discovered device or the device which previously performed pairing with the Bluetooth module 123 (i.e., name of device, etc.) to the display apparatus 200 through the interface 110.

Figure 9A:
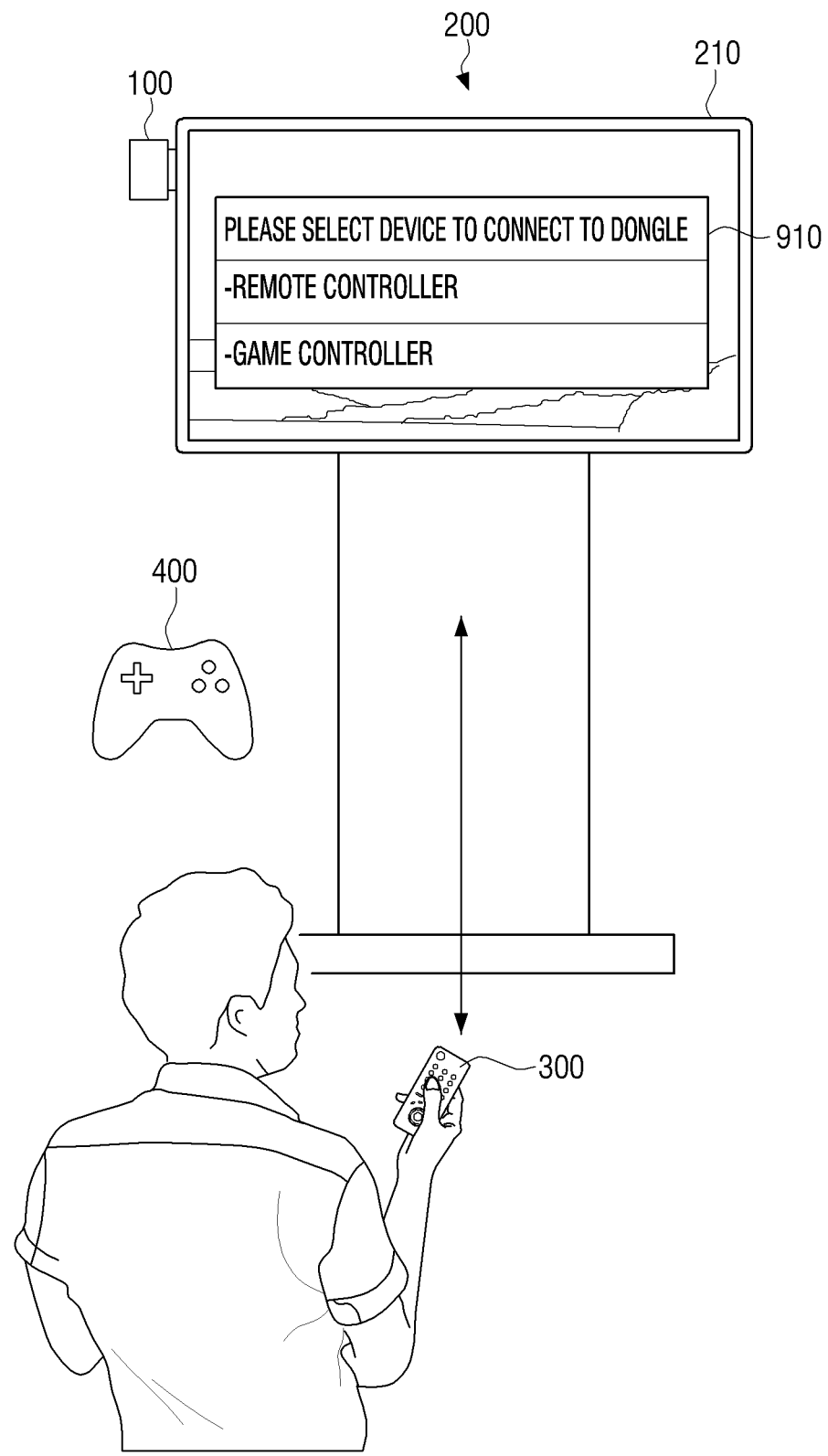
FIG. 9A is a diagram illustrating a method for coupling an electronic apparatus and a dongle according to an embodiment.

As shown in FIG. 9A, the processor 230 may, by using the information received from the dongle 100, display a list 910 on the devices located in the periphery of the dongle 100 on the display 210. For example, as shown in FIG. 9A, when the remote controller 300 and the game controller 400 are located in the periphery of the dongle 100, the list 910 may include the name of the remote controller 300 and the name of the game controller 400.

Based on receiving information on the device from the dongle 100, the processor 230 might not disconnect from the electronic apparatus which is connected with the communicator of the display apparatus 200.

The processor 230 may, based on receiving the user command for selecting one device on the list from the electronic apparatus, transmit information on the selected electronic apparatus based on the user command to the dongle 100 through the interface 220.

The processor 140 of the dongle 100 may be configured to, by using the information on the electronic apparatus received from the display apparatus 200, identify the electronic apparatus selected in the display apparatus 200 of the devices searched in the periphery of the dongle 100, and control the Bluetooth module 123 to perform communicative coupling with the identified device.

For example, when a game controller displayed on the list is selected in FIG. 9A, the processor 230 may transmit information on the game controller (i.e., name of game controller, etc.) to the dongle 100.

Figure 9B:
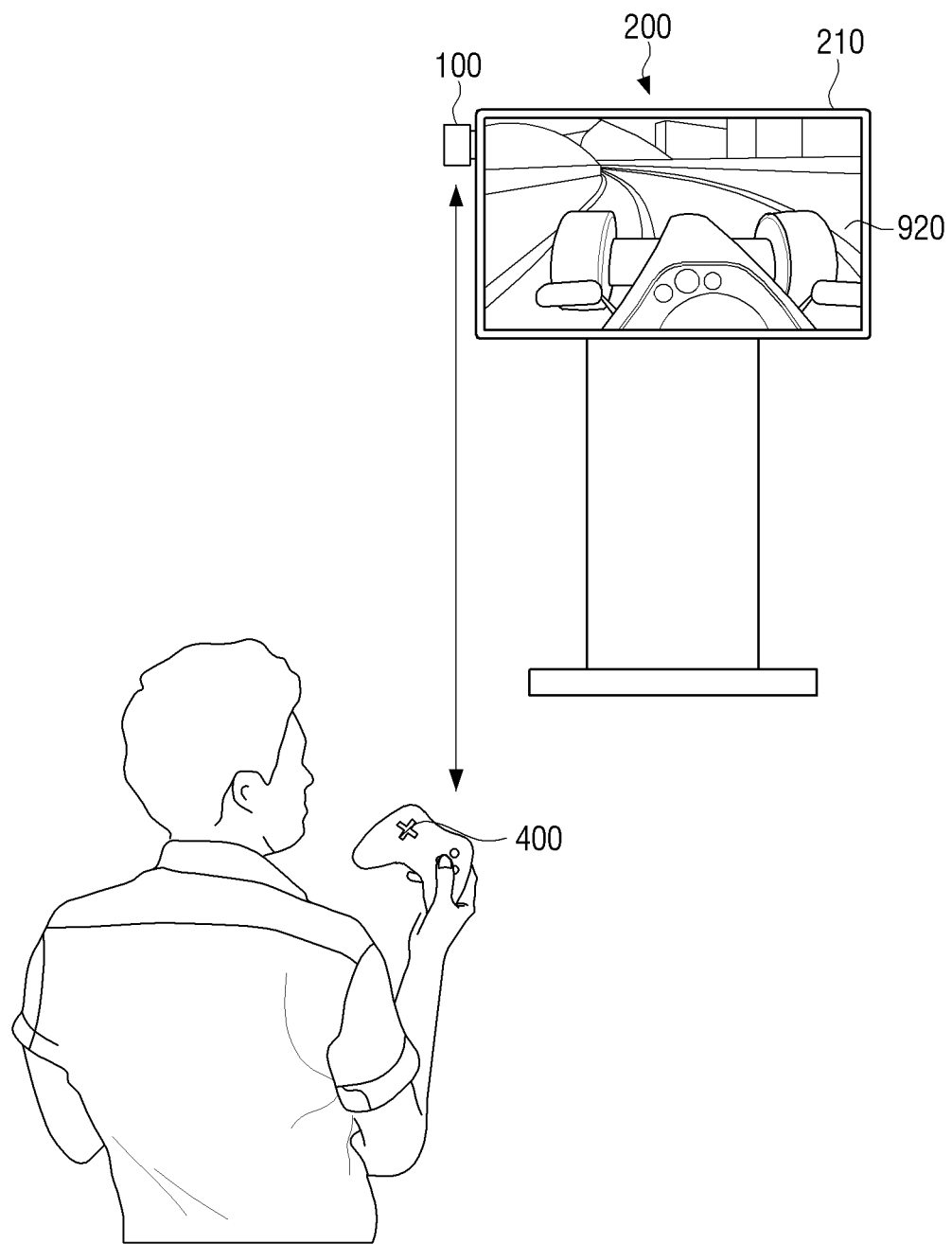
FIG. 9B is a diagram illustrating a method for coupling an electronic apparatus and a dongle according to an embodiment.

As shown in FIG. 9B, the processor 140 may control the Bluetooth module 123 to communicatively connect with the game controller 400 based on information received from the display apparatus 200. The display may display a screen 920 corresponding to a game.

According to an embodiment, in an example of the device connected to the dongle 100 being selectable based on the user command, the user may connect a more suitable device with respect to the executed application to the dongle 100, and accordingly a convenience may be improved.

FIG. 10 is a diagram for illustrating a control method of a display apparatus according to an embodiment.

Referring to FIG. 10, the information on the application stored in the dongle may be received from the dongle coupled to the display apparatus (operation S1010).

The application stored in the dongle may then be displayed based on the received information on application (operation S1020).

Based on receiving the user command selecting the displayed application, the command for executing the selected application may be transmitted to the dongle, and the command for connecting with the electronic apparatus may be transmitted to the dongle for the dongle to be connected with the electronic apparatus (operation S1030).

Based on receiving the execution screen of the application executed in the dongle, the received execution screen may be displayed (operation S1040).

When the user command for selecting the displayed application is received from the electronic apparatus while the display apparatus is connected with the electronic apparatus, the electronic apparatus may be disconnected from the display apparatus. Then, when the application executed in the dongle is terminated based on the user command input to the electronic apparatus which is connected to the dongle, the display apparatus may be connected with the electronic apparatus.

In operation S1040, based on receiving the execution screen of the application based on the user command input to the electronic apparatus connected to the dongle, the received execution screen may be displayed.

The application stored in the dongle may be a first OS-based application, and the first OS-based application and a second OS-based application stored in the display apparatus may be displayed on the display in operation S1020, and based on receiving the user command for selecting the first OS-based application of the displayed plurality of applications, the command for executing the selected application may be transmitted to the dongle in operation S1030.

The first OS and the second OS may be an OS different from each other.

The command for executing the selected application and the command for connecting with the electronic apparatus may be transmitted to the dongle through the HDMI CEC in operation S1030.

The method of executing the application stored in the dongle and connecting the dongle with the electronic apparatus when the application is executed is described above.

According to an embodiment, an apparatus and a method described herein may be implemented with software containing one or more instructions stored in a machine-readable storage medium (e.g., computer-readable storage medium) such as an internal memory or an external memory. The machine may call an instruction stored in the storage medium, and as a device capable of operating according to the called instruction, may include a device according to embodiments. Based on the instruction being executed by the processor, the processor may directly or under the control of the machine perform a function corresponding to the instruction using different elements. The one or more instructions may contain a code made by a compiler or a code executed by an interpreter. The machine-readable storage media may be provided in the form of a non-transitory storage medium. Herein, 'non-transitory' merely means that the storage medium is tangible and does not include a signal and does not distinguish that data is permanently or temporarily stored in the storage medium. For example, the 'non-transitory storage medium' may include a buffer to which data is temporarily stored.

According to an embodiment, a method may be provided as a computer program product. The computer program product may be exchanged between a seller and a purchaser as a commodity. The computer program product may be distributed in the form of a machine-readable storage medium (e.g., a compact disc read only memory (CD-ROM)), distributed online through an application store (e.g., PLAYSTORE™), or directly between two user apparatuses (e.g., smartphones). In the case of online distribution, at least a portion of the computer program product (e.g., downloadable application) may be at least stored temporarily in a storage medium readable by a device such as a manufacturer's server, a server of an application store, or a memory of a relay server, or temporarily generated.

While certain embodiments have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus, the display apparatus storing a first OS-based application executable in a first operating system (OS), comprising:
　　a display;
　　a wired communication port;
　　a wireless communication interface; and
　　a processor configured to:
　　based on a dongle device installed with a second OS that is different from the first OS of the display apparatus being connected to the wired communication port, display, on the display, the first OS-based application and a second OS-based application stored in the dongle device and based on information on the second OS-based application received from the dongle device,
　　based on receiving a user command for selecting the second OS-based application among the displayed first OS-based application and the displayed second OS-based application, transmit a first command for executing the selected second OS-based application to the dongle device through the wired communication port, and
　　based on receiving, through the wired communication port, an execution screen of the second OS-based application executed in the dongle device according to the first command, display the received execution screen on the display, wherein the execution screen pertains to a game,
　　wherein the processor is further configured to, based on the receiving the user command for selecting the displayed second OS-based application, transmit, through the wired communication port to the dongle device, a second command for communicating with an external electronic control device, so that the dongle device becomes wirelessly connected to the external electronic control device according to the second command,
　　wherein the processor is further configured to,
　　　　based on receiving the user command for selecting the second OS-based application from the external electronic control device while the display apparatus is wirelessly connected to the external electronic control device through the wireless communication interface, control the wireless communication interface to become disconnected from the external electronic control device thereby disconnecting the external electronic control device from the display apparatus, and
　　　　based on the second OS-based application executed in the dongle device being terminated according to the user command input to the external electronic control device wirelessly connected to the dongle device, control the wireless communication interface to become wirelessly connected to the external electronic control device thereby connecting the external electronic control device to the display apparatus.

2. The display apparatus of claim 1, wherein the processor is further configured to receive, through the wired communication port, the execution screen of the second OS-based application according to the user command input to the external electronic control device connected to the dongle device.

3. The display apparatus of claim 1, wherein the wired communication port comprises a high definition multimedia (HDMI) interface, and
　　wherein the processor is further configured to transmit, to the dongle device, the first command for executing the selected application and the second command for communicating with the external electronic control device through an HDMI consumer electronics control of the HDMI interface.

4. A control method of a display apparatus including a wired communication port and a wireless communication interface, the display apparatus storing a first OS-based application executable in a first operating system (OS), the control method comprising:
　　receiving information on a second OS-based application stored in a dongle device, from the dongle device connected to the display apparatus via the wired communication port;
　　displaying a first OS-based application and the second OS-based application stored in the dongle device based on the received information on the second OS-based application, the dongle device being installed with a second OS that is different from the first OS of the display apparatus;
　　based on receiving a user command for selecting the second OS-based application among the displayed first OS-based application and the displayed second OS-based application, transmitting a first command for executing the second OS-based application to the dongle device, and transmitting a second command for communicating with an external electronic control device to the dongle device, so that the dongle device becomes wirelessly connected to the external electronic control device; and
　　based on receiving an execution screen of the second OS-based application executed in the dongle device, displaying the received execution screen, wherein the execution screen pertains to a game,
　　wherein the control method further comprises:
　　　　based on the receiving the user command for selecting the second OS-based application from the external electronic control device while the display apparatus is wirelessly connected to the external electronic control device through the wireless communication interface, disconnecting, by the wireless communication interface, from the display apparatus, thereby disconnecting the external electronic control device from the display apparatus; and
　　　　based on the second OS-based application executed in the dongle device being terminated according to the user command input to the external electronic control device wirelessly connected to the dongle device, wirelessly connecting the display apparatus with the external electronic control device through the wireless communication interface thereby connecting the external electronic control device to the display apparatus.

5. The control method of claim 4, wherein the displaying the received execution screen further comprises:
　　receiving the execution screen of the second OS-based application according to the user command input to the external electronic control device connected to the dongle device.

6. The control method of claim 4, wherein the transmitting further comprises:
　　transmitting, to the dongle device, the first command for executing the second OS-based application and the second command for communicating with the external electronic control device through a high definition multimedia (HDMI) consumer electronics control of an HDMI interface of the display apparatus.

7. A display system comprising:

the display apparatus of claim 1;

the dongle device comprising:

at least one of a high definition multimedia interface and a universal serial bus that are connectable to the display apparatus, a memory storing a second plurality of applications executable in the second OS, the second OS-based application being one of the second plurality of applications, and a wireless interface configured to connect to the external electronic control device, wherein the external electronic control device comprises a remote controller configured to receive the user command and control the display apparatus based on the user command, by being directly connected to the display apparatus or by being connected to the display apparatus through the dongle device.

8. The display system of claim 7, wherein the dongle device is one of a smartphone or a portable electronic device.

* * * * *